(12) United States Patent
Maruyama

(10) Patent No.: US 6,741,539 B2
(45) Date of Patent: May 25, 2004

(54) OPTICAL SYSTEM FOR OPTICAL HEAD

(75) Inventor: Koichi Maruyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 282 days.

(21) Appl. No.: 09/725,199

(22) Filed: Nov. 29, 2000

(65) Prior Publication Data

US 2001/0002186 A1 May 31, 2001

(30) Foreign Application Priority Data

Nov. 30, 1999 (JP) ............................................ 11-340592

(51) Int. Cl.$^7$ ................................................. G11B 7/00
(52) U.S. Cl. .............................. 369/112.08; 369/112.23; 369/44.23
(58) Field of Search ....................... 369/112.01, 112.08, 369/112.07, 30.28, 112.23

(56) References Cited

U.S. PATENT DOCUMENTS

| | | | |
|---|---|---|---|
| 5,615,200 A | * | 3/1997 | Hoshino et al. ........ 369/112.07 |
| 5,835,473 A | | 11/1998 | Shimozono et al. |
| 6,088,322 A | | 7/2000 | Broome et al. |
| 6,091,689 A | * | 7/2000 | Taniguchi et al. ...... 369/112.21 |
| 6,118,594 A | | 9/2000 | Maruyama |
| 6,134,208 A | * | 10/2000 | Taniguchi et al. ...... 369/112.19 |
| 6,285,645 B1 | * | 9/2001 | Shimozono ............. 369/112.24 |

* cited by examiner

Primary Examiner—Doris H. To
Assistant Examiner—Jorge L Ortiz-Criado
(74) Attorney, Agent, or Firm—Greenblum & Bernstein, P.L.C.

(57) ABSTRACT

An optical system for an optical head employed in an optical disc drive, which uses a plurality of kinds of optical discs having different thickness cover layers, is provided with a light source, an objective lens and a light receiving unit. A plurality of diverging light beams having different wavelengths are emitted from a plurality of light emitting points, respectively. One of the light emitting points is used depending on a thickness of a cover layer of a currently loaded optical disc. The objective lens is capable of converging each diverging beam on a data recording surface of the optical disc. The light receiving unit receives a beam reflected by the optical disc and generates electronic signals representing the recorded data. In this optical system, an image magnification M of the objective lens satisfies a condition: $-0.144 < M < -0.099$.

14 Claims, 10 Drawing Sheets

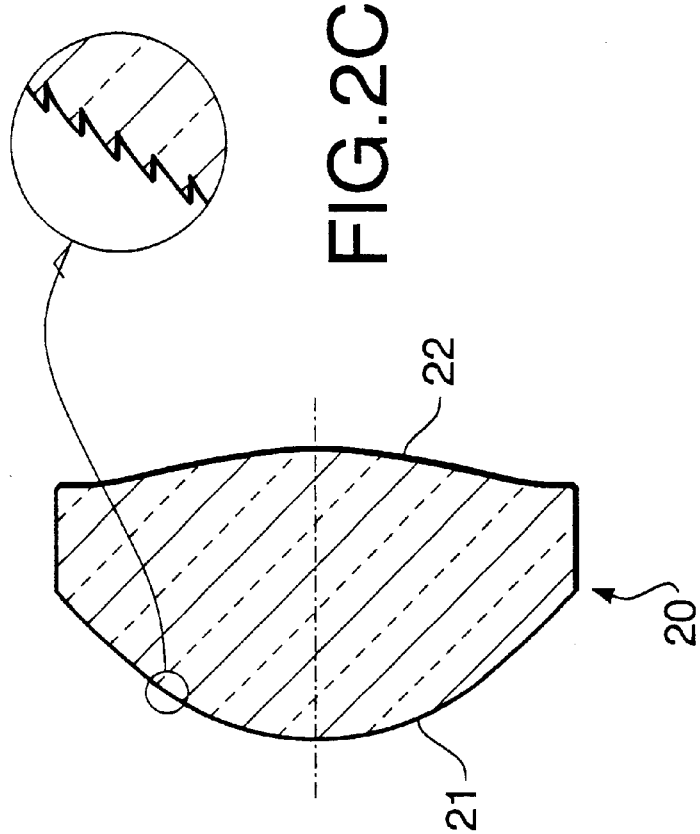
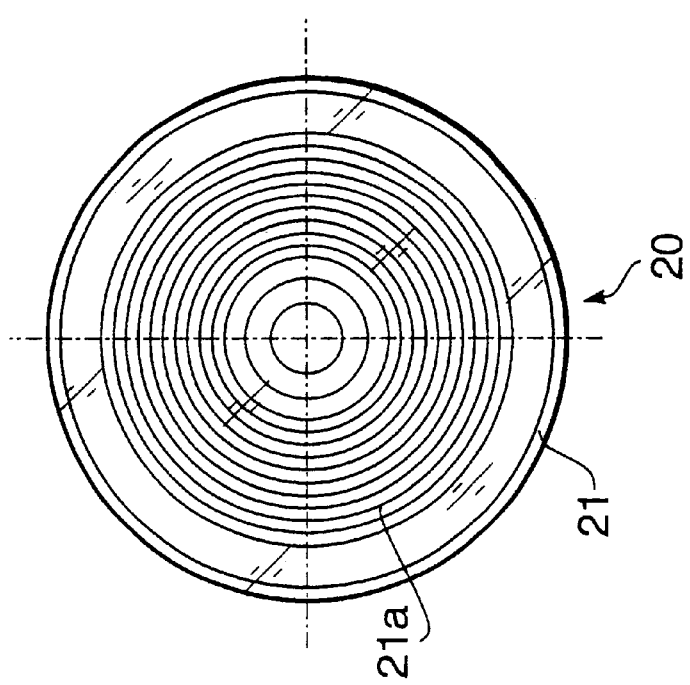

SPHERICAL ABERRATION
SINE CONDITION

ASTIGMATISM

SPHERICAL ABERRATION
SINE CONDITION

SPHERICAL ABERRATION
SINE CONDITION

SPHERICAL ABERRATION
SINE CONDITION

ASTIGMATISM

SPHERICAL ABERRATION
SINE CONDITION

ASTIGMATISM

SPHERICAL ABERRATION
SINE CONDITION

SPHERICAL ABERRATION
SINE CONDITION

SPHERICAL ABERRATION
SINE CONDITION

ASTIGMATISM

OPTICAL SYSTEM FOR OPTICAL HEAD

BACKGROUND OF THE INVENTION

The present invention relates to an optical system of an optical head employed, for example, in an optical disc drive that is capable of recording/reproducing data on a plurality of kinds of optical discs formed with cover-layers having different thickness.

Conventionally, two types of the optical systems for an optical head are known. One is known as an infinite conjugate system in which a laser beam emitted from a laser diode is collimated by collimating lens, and then converged by an objective lens. The other is known as a finite conjugate system in which a diverging laser beam emitted from a laser diode is directly converged by an objective lens.

In the latter system (i.e., finite system), the number of elements can be reduced, and therefore the optical system can be downsized. Accordingly, such an optical system has been widely employed as an optical system for CD (compact disc) drive. Generally, an image magnification of such an optical system for the CD drive is designed within a range from −0.25 to −0.17.

In the fnite system, on- and off-axial aberrations due to focusing and/or tracking movement of an objective lens can be sufficiently suppressed with respect to a single predetermined optical disc. However, for a plurality of discs (e.g., CD and DVD (digital versatile disc)) respectively provided with cover layers having different thickness, the aberrations cannot be suppressed sufficiently. In particular, if an optical system is designed to have the above-indicated image magnification, and the optical system is used for a DVD, the aberration is significantly greater, which prevents recording/reproducing of data on the DVD.

SUMMARY OF THE INVENTION

It is therefore an object of the invention to provide an improved optical system of a focal type which can be employed in an optical disc drive for recording/reproducing data on a plurality of optical discs respectively provided with a plurality of cover layers having different thickness.

For the above object, according to the present invention, there is provided with an optical system for an optical head employed in an optical disc drive, the optical disc drive using a plurality of optical discs, cover layers of which have different thickness, provided with a light source unit provided with a plurality of light emitting points that are arranged close to each other, a plurality of diverging light beams having different wavelengths being emitted from the plurality of light emitting points, respectively, one of the plurality of light emitting points being used depending on a thickness of a cover layer of an optical disc, an objective lens that converges each of the plurality of diverging light beams emitted from the plurality of light emitting points on a data recording surface of an optical disc, and a light receiving unit that receives a light beam reflected by the data recording surface of the optical disc and generates electronic signals corresponding to the received beam. In this optical system, an image magnification M of the objective lens satisfies a condition:

−0.144<M<−0.099.

If the image magnification M of the objective lens satisfies the above condition, for anyone of optical discs having different cover layers and the wavelength of the selective light beam, wavefront aberration, which varies as the objective lens is moved in the axial direction, can be suppressed to an allowable level.

In particular, a light beam having a longer wavelength is selected for an optical disc having a thicker cover layer, the objective lens being located closer to the disc, and a light beam having a shorter wavelength is selected for an optical disc having a thinner cover layer, the objective lens being located farther from the disc.

It is preferable that a distance from each of the plurality of light emitting points to a surface of the cover layer of a disc is constant regardless of the thickness of the cover layer.

Optionally, the objective lens has a characteristic such that spherical aberration varies depending on the wavelength of a beam passing therethrough.

In particular, a diffraction lens structure is formed on at least one refraction surface of the objective lens, the diffraction lens structure has a characteristic such that spherical aberration varies depending on the wavelength of a beam passing therethrough.

In this case, the diffraction lens structure may be configured such that the spherical aberration changes in a under-corrected direction when the wavelength of the light beam incident thereon increases.

Optionally, the light source unit may include two light emitting points formed on a single chip.

Further optionally, the light receiving unit is mounted on the same base plate on which the light source unit is provided.

According to another aspect of the invention, there is provided an optical system for optical head employed in an optical disc drive, the optical disc drive using a plurality of optical discs, cover layers of which have different thickness, provided with a light source that selectively emits a plurality of diverging light beams having different wavelengths, one of the plurality of light beams being emitted depending on a thickness of a cover layer of an optical disc currently loaded in the disc drive, an objective lens that converges each of the plurality of diverging light beams emitted from the plurality of light emitting points on a data recording surface of an optical disc, and a light receiving unit that receives a light beam reflected by the data recording surface of the optical disc and generates electronic signals corresponding to the received beam. In this optical system, an image magnification M of the objective lens satisfies a condition:

−0.144<M<−0.099.

With this configuration, regardless of the thickness of the cover layer of an optical disc and the wavelength of the selected light beam therefor, wavefront aberration can be suppressed to an allowable level.

BRIEF DESCRIPTION OF THE ACCOMPANYING DRAWINGS

FIG. 1A schematically shows a side view of an optical system to which the present invention is applied;

FIG. 1B is a plan view of a laser module employed in the optical system shown in FIG. 1A;

FIG. 2A schematically shows a front view of an objective lens of the optical system shown in FIG. 1A;

FIG. 2B schematically shows a side view of the objective lens shown in FIG. 2A;

FIG. 2C is an enlarged view of a circled portion of the objective lens shown in FIG. 2B;

DESCRIPTION OF THE EMBODIMENTS

Hereinafter, embodiments of the present invention will be described referring to the accompanying drawings.

Figure 1A:
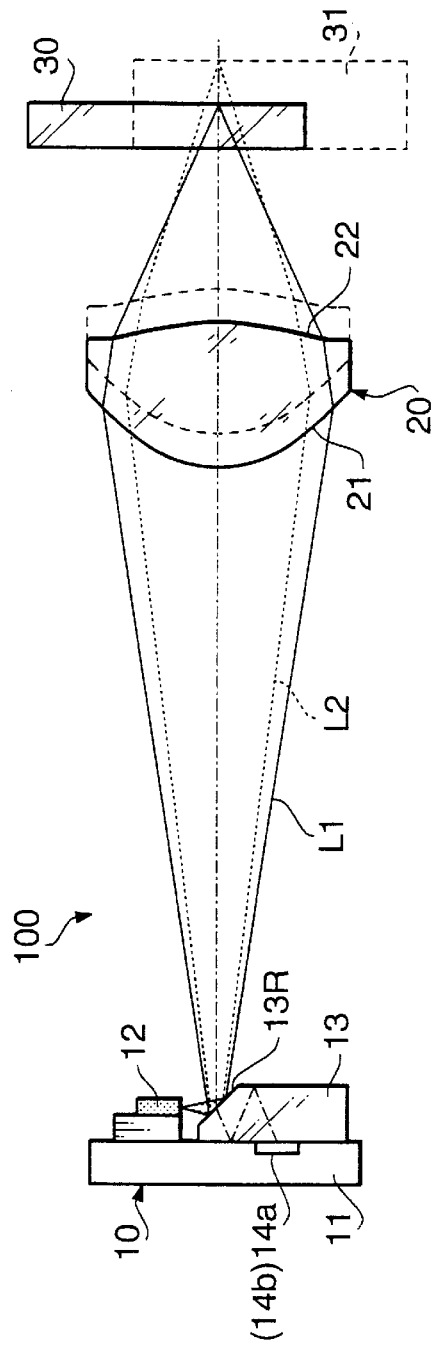
Figure 1B:
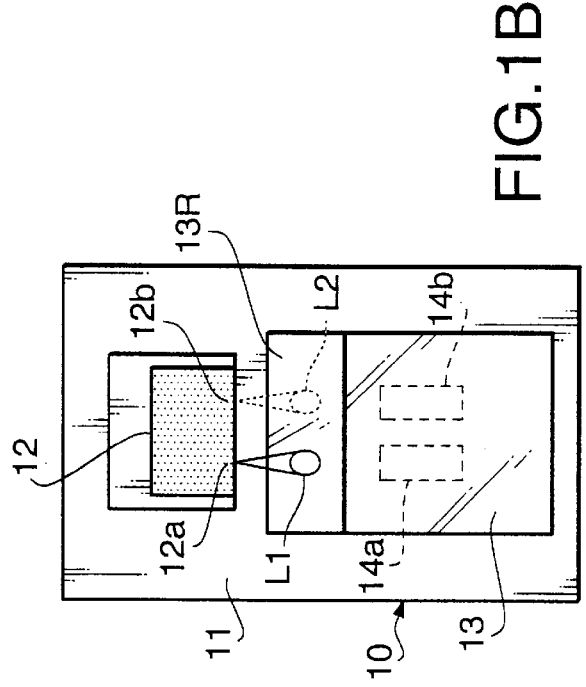

FIG. 1A schematically shows a side view of an optical system 100 of an disc drive (not shown) that is capable of reading/reproducing data on anyone of DVD, CD and CD-R. FIG. 1B is a plan view of a laser module 10 employed in the optical system 100 shown in FIG. 1A. The optical system 100 includes, as shown in FIG. 1A, the laser module 10 and an objective lens 20. The laser module 10 functions to emit and receive a laser beam. The objective lens 20 is for converging a laser beam, which is a diverging beam, emitted by the laser module 10 on a data recording surface of an optical disc 30 or 31.

The laser module 10 includes a silicon base plate 11, on which a single chip laser diode 12, a prism 13, a pair of light receiving elements 14a and 14b are mounted. The laser diode 12 is constituted such that two active layers of different types are formed, and has a first light emitting point 12a for emitting 658 nm laser beam, and a second light emitting point 12b for emitting 787 nm laser beam. The first emitting point 12a and the second emitting point 12b are spaced from each other by approximately 100 μm.

A laser beam emitted by the first or second emitting point 12a or 12b is reflected by an inclined reflection surface 13R of the prism 13. The inclined reflection surface 13R is inclined at 45 degrees with respect to the principle ray of the laser beam as well as the optical axis of the objective lens 20. Accordingly, the laser beam reflected by the reflection surface 13R is incident on the objective lens 20. The laser beam emitted from the first or second emitting point 12a or 12b is a diverging beam, which are incident on the objective lens 20 still as a diverging beam, and converged by the objective lens 20 on the data recording surface of the optical disc 30 or 31. Although not shown, the objective lens 20 is movable in a direction of the optical axis thereof by a well-know focusing mechanism and in a radial direction of the optical disc 30 or 31 by a well-known tracking mechanism.

In this specification and drawings, a disc whose cover layer is relatively thin (e.g., 0.6 mm) and whose data recording density is relatively high is referred to as a first disc 30. The first disc 30 is indicated by solid lines in FIG. 1A. Further, a disc whose cover layer is relatively thick (e.g., 1.2 mm) and whose data recording density is relatively low is referred to as a second disc 31. The second disc 31 is indicated by broken lines in FIG. 1A. An example of the first disc 30 is a DVD disc, and an example of the second disc 31 is a CD or a CD-R.

When the first disc 30 is used, a laser beam L1 (658 nm) emitted from the first emitting point 12a is used to form a relatively small beam spot on the data recording surface of the disc 30. When the second disc 31 is used, a laser beam L2 (787 nm) emitted from the second emitting point 12b is used taking a spectral reflectance of the CD-R into consideration.

Each of the first and second discs 30 and 31 are placed on a turn table (not shown) to be rotated, with the objective lens side surface contacting the turn table. Since the emitting points 12a and 12b are located at the same position along the beam proceeding direction, a distance from each of the emitting points 12a and 12b to the surface of the cover layer of the disc 30 or 31 is constant regardless of the types of discs. However, as aforementioned, since the thickness of the cover layers of the discs 30 and 31 are different, distances from the light emitting point 12a or 12b to the data recording surfaces of the discs 30 and 31 are different. Therefore, the objective lens 20 must be moved (i.e., focusing is performed) in order to locate the converging point of a laser beam on the surface of the data recording layer.

Specifically, when data is recorded on or read from the first optical disc 30, the objective lens 20 is located at a first position that is indicated by solid lines. In this case, the laser beam L1 (658 nm) emitted from the first emitting point 12a is converged on the data recording surface of the first optical disc 30. When data is recorded on or read from the second optical disc 31, the objective lens 20 is located at a second position that is indicated by broken lines. In this case, the laser beam L2 (788 nm) emitted from the second emitting point 12b is converged on the data recording surface of the second optical disc 31.

Light reflected by the data recording surface of the disc 30 or 31 passes the objective lens 20 and impinges on the laser module as a converging beam. A part of the beam incident on the reflection surface 13R of the prism 13 passes therethrough, is reflected inside the prism 13 twice, and impinges on first or second light receiving element 14a or 14b. Specifically, the laser beam L1 emitted from the first emitting point 12a is incident on the first light receiving element 14a, and the laser beam L2 emitted from the second emitting point 12b is incident on the second light receiving element 14b. Each of the light receiving elements 14a and 14b is a well-known element having a plurality of light receiving areas, and based on the quantity of light received by each area, a reproducing signal corresponding to the data recorded on the disc 30 or 31, a focusing error signal, and a tracking error signal are generated. Since generation of such signals are well-known, description thereof is omitted.

The image magnification M of the objective lens 20 is designed to satisfy condition (1).

$$-0.144 < M < -0.099 \tag{1}$$

It should be noted that, in the finite optical system as shown in FIG. 1, the image magnification M of the objective lens 20 affects the aberrations when the focusing and/or tracking are performed.

In the condition (1), the image magnification M is defined as:

a/b, where a (>0) is an optical distance from the objective lens 20 to the data recording surface of the disc 30 or 31, and b (<0) is an optical distance from the emitting point 12a or 12b to the objective lens. Since the image magnification M is defined as above, it has a negative sign. In this specification, therefore, when it is described that the image magnification M is greater, M is closer to zero, the absolute value of M is smaller (i.e., |b| is greater), and when it is described that the image magnification is smaller, the absolute value of M is greater (i.e., |b| is smaller).

In the finite optical system, when the objective lens 20 is moved in the direction of the optical axis for focusing, the spherical aberration varies. When the thickness of the cover layer of the disc 30 or 31, and moving amount of the objective lens 20 depending on which one of the discs 30 and 31 is used is known, the spherical aberration is represented by a function of the image magnification M. The greater the image magnification M is, the smaller the variation of the spherical aberration is. Therefore, in view of compensation for the spherical aberration, it is preferable that the image magnification M is greater (i.e., the absolute value of M is smaller).

When the objective lens 20 is moved in the direction orthogonal to the optical axis thereof for tracking, abaxial aberrations such as coma and astigmatism occur. The amount of such abaxial aberrations vary depending on the thickness of the cover layer. Therefore, in a system where a single objective lens 20 is used for two optical discs 30 and 31 having different cover layers, it is impossible to compensate for the abaxial aberrations with respect to the discs 30 and 31 similarly. The abaxial aberrations are smaller when the image magnification is greater. Therefore, in order to suppress the abaxial aberrations with respect a plurality of discs, it is preferable that the image magnification M is greater (i.e., closer to zero).

Specifically, when the CD (i.e., the disc 31) is used, the surface of the disc displaces by approximately 1 mm in the direction of the optical axis. Therefore, the optical system should be configured such that the aberrations do not exceed allowable level when the objective lens is moved for focusing to follow the displaced disc surface. Regarding tracking, the objective lens 20 should be allowed to move within a range of approximately ±0.4 mm. That is, the aberrations do not exceed an allowable level when the objective lens is moved within the above movable range for tracking.

The lower limit of the condition (1) is determined as a value when (1) the allowable level of wavefront aberration due to spherical aberration when the focusing is performed is 0.05λ (RMS vale; λ is a wavelength), and (2) the allowable level of wavefront aberration due to coma and astigmatism when tracking is performed is 0.05λ, and the wavefront aberration does not exceed the allowable level if the focusing for 1 mm, and tracking for 0.4 mm are performed, respectively.

As described above, in view of suppressing the aberrations, it is preferable that the image magnification is greater. On the other hand, in order to have the laser beam impinge on the objective lens efficiently, and in order to downsize the optical system, it is preferable that the image magnification M is smaller. The upper limit of the condition (1) is determined such that the quantity of light impinging on the objective lens when the image magnification M is at its upper limit is not less than a half of the quantity of light impinging on the objective lens 20 when the image magnification M is at its lower limit.

The objective lens 20 will be described referring to FIGS. 2A through 2C.

FIG. 2A schematically shows a front view of the objective lens 20, FIG. 2B schematically shows a side view of the objective lens 20, and FIG. 2C is an enlarged view of a circled portion of the objective lens 20 shown in FIG. 2B.

The objective lens 20 is a single lens formed of synthetic resin. The objective lens 20 is bi-convex lens having two refraction surfaces, both of which are aspherical surfaces. Further, on one surface 21, a diffraction lens structure 21a, which has concentric annular zones centered around the optical axis of the objective lens 20. Boundaries of the annular zones are formed as stepped portions directed in parallel with the optical axis, like a Fresnel lens.

Depending on the disc used, i.e., disc 30 or 31, the thickness of the cover layer is different. Thus, the discs 30 and 31 are exchanged, spherical aberration changes. Spherical aberration is changed in an overcorrected direction when the thickness of the cover layer increases.

When the objective lens 20 is moved in the axial direction with the diverging beam incident on the objective lens 20, spherical aberration changes. In this case, spherical aberration is changed in an overcorrected direction when the objective lens 20 moves away from the laser module 10 and approaches the disc 30 or 31.

In order to solve the above deficiency, the diffraction lens structure 21a has a characteristic such that the spherical aberration changes depending on the wavelength of the beam passing therethrough. Specifically, the diffraction structure 21a is constructed such that the spherical aberration changes in the undercorrected direction when the wavelength increases. With this configuration, whichever disc 30 or 31 is used, a sufficient wavefront can be formed.

Numerical Embodiments

Hereinafter, two numerical embodiments will be described. In the two numerical embodiments, the laser module 10 are commonly referred to. Each of objective lenses of the two numerical embodiments is for an optical disc drive using the first disc 30 and the second disc 31. As described above, the thickness of the cover layer of the first disc 30 is 0.6 mm, and that of the second disc 31 is 1.2 mm. In each numerical embodiment, the diffraction lens structure is formed on the first surface of the objective lens 20.

First Numerical Embodiment

Figure 3:
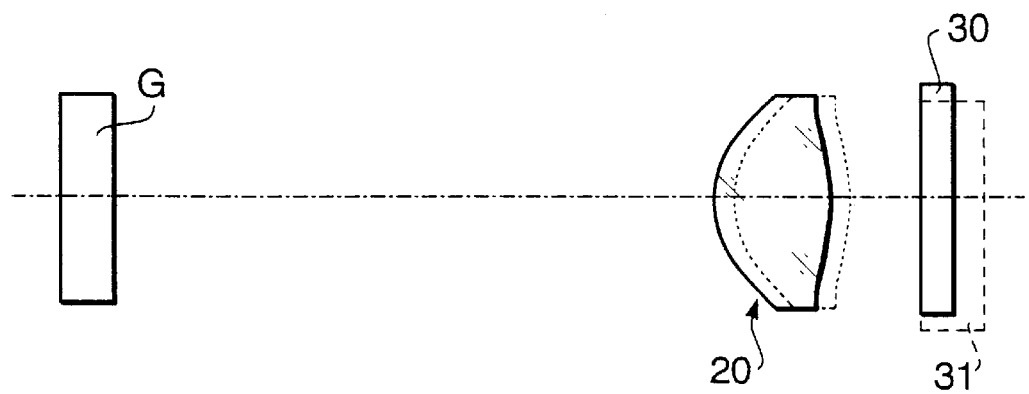
FIG. 3 shows a configuration of an objective lens according to a first embodiment.

FIG. 3 shows the objective lens 20 and the discs 30 and 31 according to the first numerical embodiment. When the first disc 30 (indicated by solid line) is used, the objective lens 20 is located at a first position (indicated by the solid line) far from the optical disc 30. When the second disc 31 (indicated by broken line) is used, the objective lens 20 is located at a second position (indicated by broken line) closer to the optical disc 31. A parallel plate G represents a cover glass provided at the laser module 10.

A numerical structure of the objective lens 20 according to the first numerical embodiment 1 is indicated in TABLE 1. In TABLE 1, #0 represents light emitting points, #1 and

2 represent the surfaces of the cover glass G, #3 and #4 represent the first and second surfaces of the objective lens 20, #5 and #6 represent the cover layer of the optical disc 30 or 31. In TABLE 1, symbols $\lambda_1$, $NA_1$, $M_1$ and $d_1$ respectively represent the wavelength (unit: nm), a numerical aperture, an image magnification and a distance (unit: mm) between surfaces along the optical axis, when the first optical disc 30 is used. Further, symbols $\lambda_2$, $NA_2$, $M_2$ and $d_2$ respectively represent the wavelength (unit: nm), a numerical aperture, an image magnification and a distance (unit: mm) between surfaces along the optical axis, when the second optical disc 31 is used. further, r represents a macroscopic paraxial radius of curvature (unit: mm), and $n\lambda$ represents refractive index for light whose wavelength is $\lambda$.

As aforementioned, the first surface 21 of the objective lens 20 is, when the diffraction lens structure is removed, an aspherical surface (i.e., the base curve of the diffraction lens structure is an aspherical surface), and the second surface 22 is also an aspherical surface. A rotationally symmetrical aspherical surface is expressed by a formula (2) below.

$$X(h) = \frac{Ch^2}{1 + \sqrt{1 - (1+K)C^2h^2}} + A_4 h^4 + A_6 h^6 + A_8 h^8 + A_{10} h^{10} + A_{12} h^{12} \quad (2)$$

where X(h) is a sag (i.e., a distance from a surface, which is tangential to the aspherical surface at the optical axis, at a position whose height with respect to the optical axis is h), C is a curvature of the aspherical surface at the optical axis (C=1/r), K is a conical coefficient, and $A_4$–$A_{12}$ are fourth, sixth, eighth, tenth and twelfth order aspherical coefficients, respectively. In TABLE 1, a radius r of curvature at the optical axis is indicated.

Further, the diffraction lens structure formed on the first surface 21 of the objective lens 20 is expressed by the optical path difference function (3) below.

$$\phi(h) = (P_2 h^2 + P_4 h^4 + P_6 h^6 + \ldots) \times \lambda \quad (3)$$

where, $\phi(h)$ represents an optical path difference (i.e., a difference of an optical path length, at a height h from the optical axis, between a ray which is not diffracted by the diffraction lens structure and a ray which is diffracted by the diffraction lens structure. $P_2$, $P_4$, $P_6$, . . . represent second, fourth, sixth, . . . order coefficients, respectively.

The conical coefficients and aspherical coefficients defining aspherical surfaces, and the optical path difference coefficients defining the diffraction lens structure are indicated in TABLE 2.

TABLE 1

| | | | | |
|---|---|---|---|---|
| $\lambda 1$ = 658 nm | | NA1 = 0.60 | | M1 = −0.1002 |
| $\lambda 2$ = 785 nm | | NA2 = 0.47 | | M2 = −0.1009 |

| | r | d1 | d2 | n658 | n787 |
|---|---|---|---|---|---|
| #0 | | 20.000 | 20.000 | | |
| #1 | ∞ | 1.000 | 1.000 | | |
| #2 | ∞ | 11.700 | 12.064 | 1.51 | |
| #3 | 2.010 | 2.300 | 2.300 | 1.54052 | 1.53660 |
| #4 | −4.950 | 1.710 | 1.346 | | |
| #5 | ∞ | 0.600 | 1.200 | | |
| #6 | ∞ | | | | |

TABLE 2

| | FIRST SURFACE | SECOND SURFACE |
|---|---|---|
| K | −0.430 | 0.000 |
| A4 | −6.079 × 10⁻³ | 2.222 × 10⁻² |
| A6 | −1.328 × 10⁻⁴ | −6.234 × 10⁻⁴ |
| A8 | −1.257 × 10⁻⁴ | −2.373 × 10⁻³ |
| A10 | 1.182 × 10⁻⁵ | 7.317 × 10⁻⁴ |
| A12 | −8.870 × 10⁻⁶ | −7.636 × 10⁻⁵ |
| P2 | 0.000 | |
| P4 | −2.071 | |
| P6 | −9.810 × 10⁻² | |
| P8 | 0.000 | |

Figure 4A:
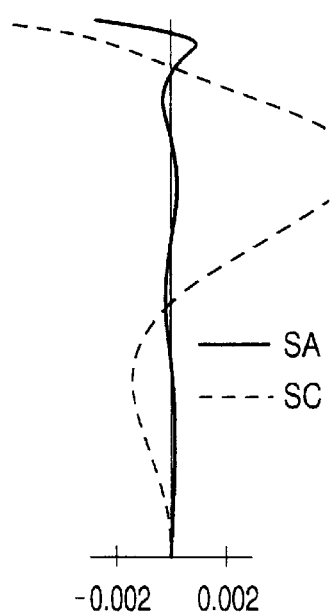
FIGS. 4A and 4B show spherical aberration, sine condition and astigmatism when the objective lens shown in FIG. 3 is used for a first disc.
Figure 4B:

FIGS. 4A and 4B show spherical aberration and astigmatism when the objective lens 20 shown in FIG. 3 is used for a first disc 30, and the adjusting amount for focusing and tracking are zero (which will be referred to as a reference condition). FIG. 4A shows spherical aberration SA and sine condition SC. The vertical axis of FIG. 4A represents the numerical aperture NA. FIG. 4B shows astigmatism (S: sagital; M: meridional). The vertical axis of FIG. 4B represent image height h. Horizontal axis of each of FIGS. 4A and 4B represents the aberration (unit: mm).

Figure 5A:
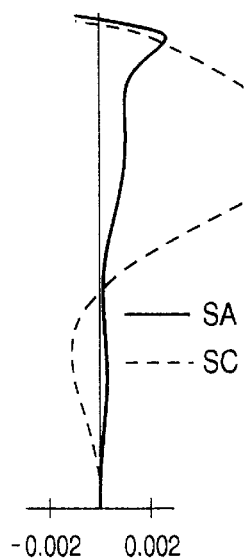
FIGS. 5A and 5B show spherical aberration and sine condition when the objective lens shown in FIG. 3 is used for the first disc, and focusing is performed.
Figure 5B:
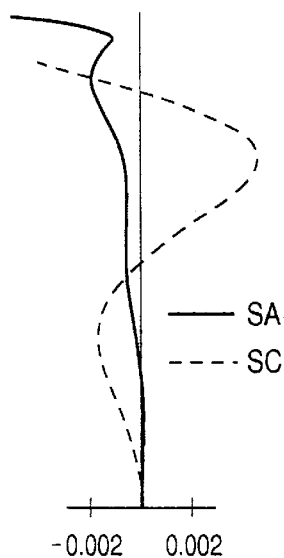

FIGS. 5A and 5B show spherical aberration and sine condition when the objective lens 20 is used for the first disc 30, and focusing is performed (i.e., the surface of the first disc 30 moves in the direction of the optical axis, and the objective lens 20 is also moved for focusing). FIG. 5A shows the characteristic when the first disc 30 is moved away from the laser module 10 by 1 mm (i.e., the displacement of the disc is +1 mm). FIG. 5B shows the characteristic when the first disc 30 is moved toward the laser module 10 by 1 mm (i.e., the displacement of the disc is −1 mm).

Figure 6A:
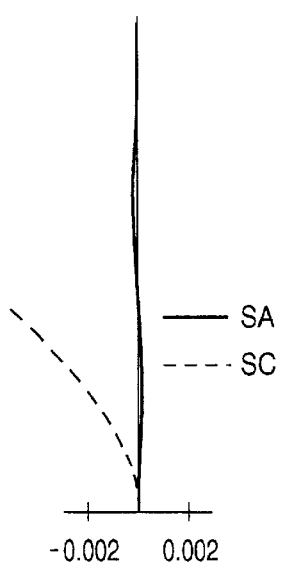
FIGS. 6A and 6B show spherical aberration, sine condition and astigmatism when the objective lens shown in FIG. 3 is used for a second disc.
Figure 6B:
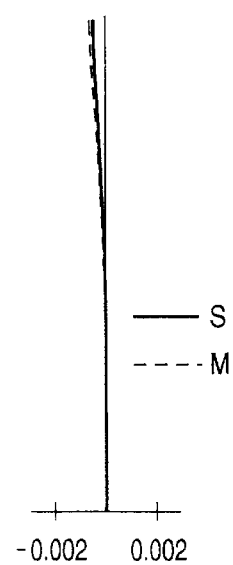
Figure 7A:
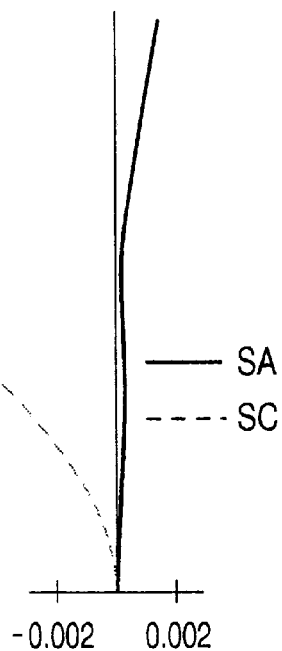
FIGS. 7A and 7B show spherical aberration and sine condition when the objective lens shown in FIG. 3 is used for the second disc, and focusing is performed.
Figure 7B:
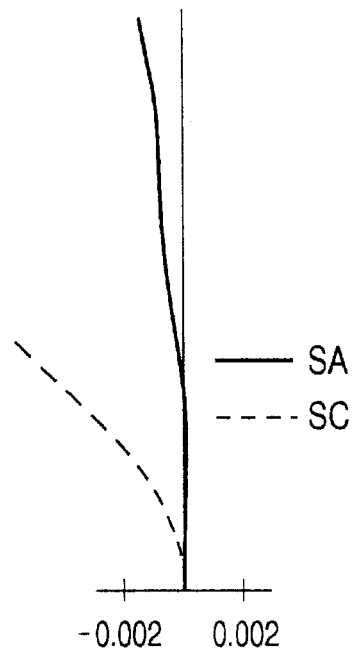

FIGS. 6A and 6B show spherical aberration and astigmatism when the objective lens 20 is used for a second disc 31 and is in a reference condition, and FIGS. 7A and 7B show spherical aberration and sine condition when the objective lens 20 is used for the second disc 31, and focusing is performed.

Wavefront aberration when the objective lens 20 is in a reference condition, and moved for focusing when the discs are moved by ±1 mm are indicated in TABLE 3.

TABLE 3

| | FIRST DISC 30 | SECOND DISC 31 |
|---|---|---|
| REFERENCE CONDITION | 0.005λ | 0.002λ |
| +1 mm | 0.027λ | 0.009λ |
| −1 mm | 0.026λ | 0.007λ |

Given that the image magnification M of the objective lens 20 is approximately −0.1, if the allowable level of the wavefront aberration is 0.050λ, change of the wavefront aberration due to displacement of the optical disc 30 and 31 by 1 mm is within the allowable range.

Aberration due to the tracking operation will be discussed.

Figure 8:
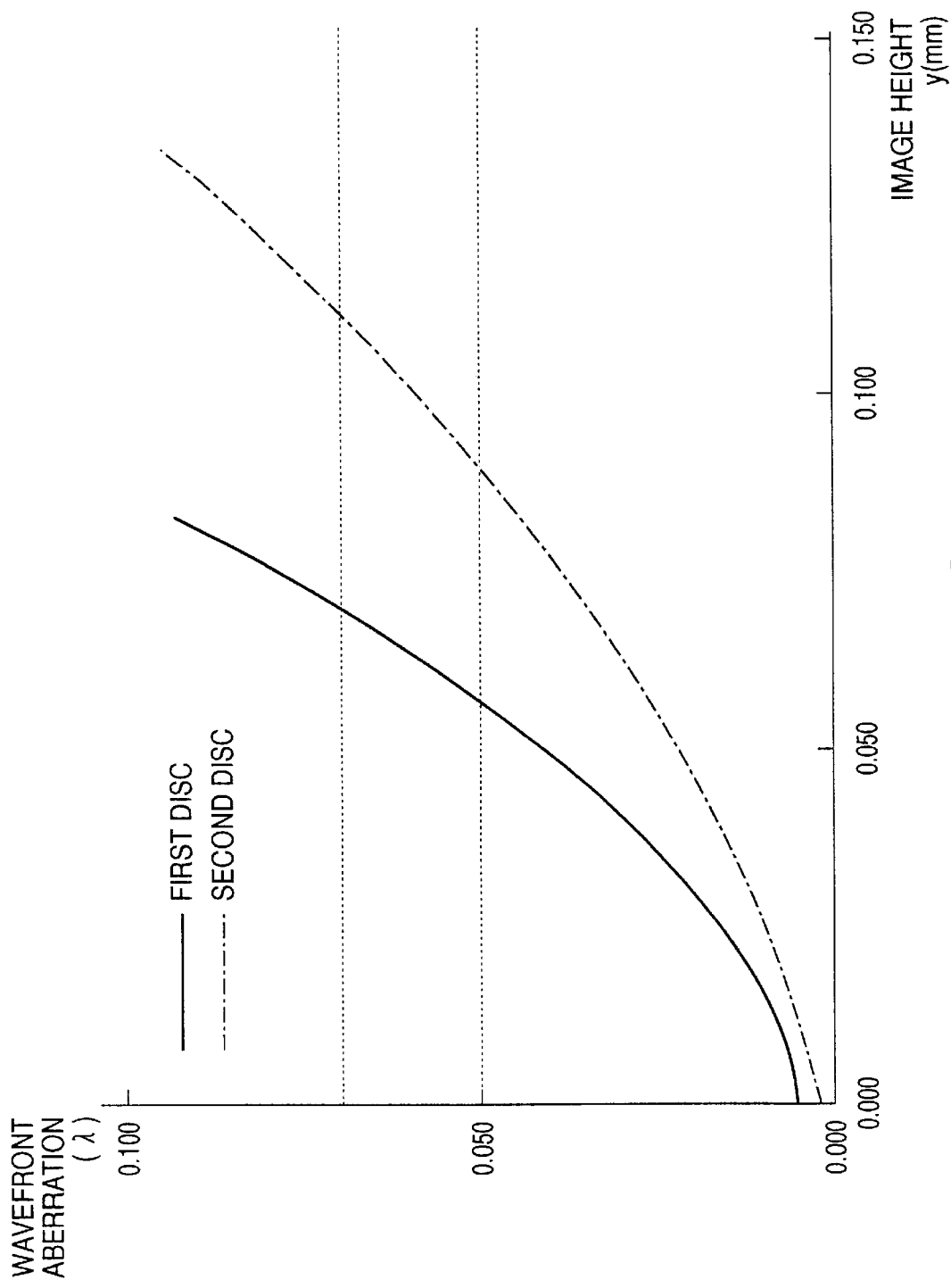
FIG. 8 is a graph showing a relationship between an image height and wavefront aberration with respect to the optical system according to the first embodiment.

FIG. 8 is a graph showing a relationship between an image height (i.e., a distance from the optical axis) y and wavefront aberration with respect to the optical system according to the first embodiment. The characteristic with respect the first disc 30 is represented by a solid line, the characteristic with respect to the second disc 31 is represented by a one-dotted line.

According to the graph shown in FIG. 8, the image height y at which the wavefront aberration is 0.05λ is 0.0571 mm for the first disc 30, and 0.0899 mm for the second disc 31. If the allowable level of the wavefront aberration is 0.05λ, the above indicated image heights are in the allowable range.

An allowable width X for tracking of the objective lens 20 is determined by the following formula (4).

$$X = y(1 - 1/M) \quad (4)$$

where, y is an image height, and M is the image magnification of the objective lens 20.

According to formula (4), the allowable tracking width is ±0.627 mm for the first disc 30 (M=−0.1002), and ±0.981 mm for the second disc 31 (M=−0.1009). Generally, it is considered that the necessary tracking width is ±0.4 mm. Therefore, the widths obtained above satisfy the general requirement.

Second Numerical Embodiment

Figure 9:
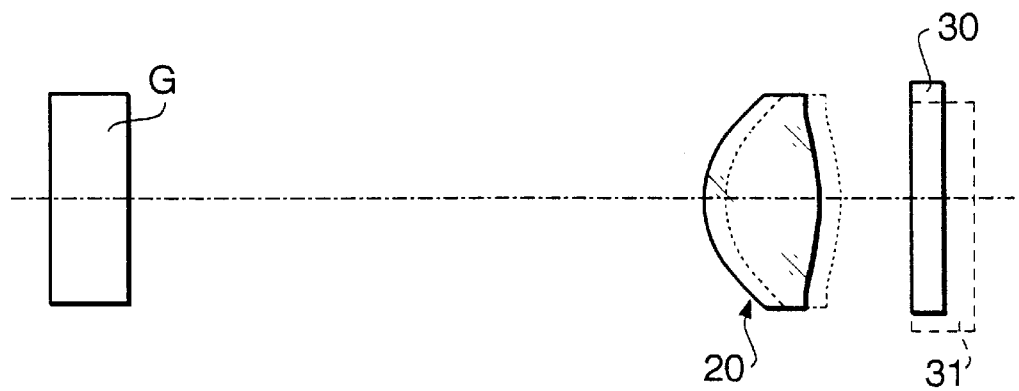
FIG. 9 shows a configuration of an objective lens according to a second embodiment.

FIG. 9 shows the objective lens 20 and the discs 30 and 31 according to the second numerical embodiment. When the first disc 30 (indicated by solid line) is used, the objective lens 20 is located at a first position (indicated by the solid line) apart from the optical disc 30. When the second disc 31 (indicated by broken line) is used, the objective lens 20 is located at a second position (indicated by broken line) closer to the optical disc 31. A parallel plate G represents a cover glass provided at the laser module 10.

The numerical structure of the objective lens according to the second embodiment is indicated in TABLE 4. Further, the conical coefficients and aspherical coefficients defining aspherical surfaces, and the optical path difference coefficients defining the diffraction lens structure are indicated in TABLE 5.

TABLE 4

| λ1 = 658 nm | NA1 = 0.60 | M1 = −0.1432 |
| λ2 = 785 nm | NA2 = 0.47 | M2 = −0.1418 |

| | r | d1 | d2 | n658 | n787 |
|---|---|---|---|---|---|
| #0 | | 10.000 | 10.000 | | |
| #1 | ∞ | 1.500 | 1.500 | 1.51 | |
| #2 | ∞ | 11.300 | 11.655 | | |
| #3 | 1.956 | 2.270 | 2.270 | 1.54052 | 1.53660 |
| #4 | −4.305 | 1.730 | 1.365 | | |
| #5 | ∞ | 0.600 | 1.200 | | |
| #6 | ∞ | | | | |

TABLE 5

| | FIRST SURFACE | SECOND SURFACE |
|---|---|---|
| K | −0.430 | 0.000 |
| A4 | −7.810 × 10$^{-3}$ | 2.431 × 10$^{-2}$ |
| A6 | −2.290 × 10$^{-4}$ | 9.820 × 10$^{-5}$ |
| A8 | −8.730 × 10$^{-5}$ | −2.593 × 10$^{-3}$ |
| A10 | 9.450 × 10$^{-6}$ | 7.182 × 10$^{-4}$ |
| A12 | −1.040 × 10$^{-5}$ | −6.844 × 10$^{-5}$ |
| P2 | 1.000 | |
| P4 | −2.160 | |
| P6 | −1.888 × 10$^{-1}$ | |
| P8 | 3.110 × 10$^{-2}$ | |

Figure 10A:
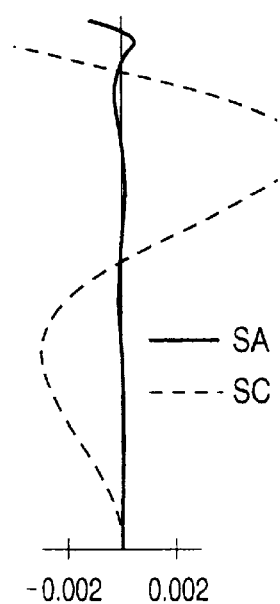
FIGS. 10A and 10B show spherical aberration, sine condition and astigmatism when the objective lens shown in FIG. 9 is used for the first disc.
Figure 10B:
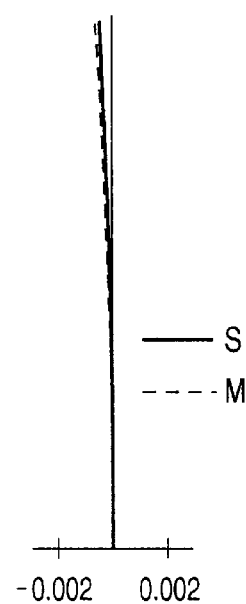

FIGS. 10A and 10B show spherical aberration, sine condition and astigmatism when the objective lens 20 shown in FIG. 9 is used for a first disc 30, when the objective lens 20 is in the reference condition. FIG. 10A shows spherical aberration SA and sine condition SC, and FIG. 10B shows astigmatism.

Figure 11A:
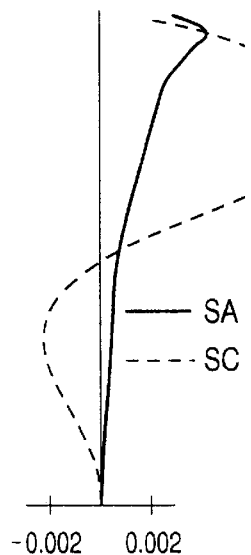
FIGS. 11A and 11B show spherical aberration and sine condition when the objective lens shown in FIG. 9 is used for the first disc, and focusing is performed.
Figure 11B:
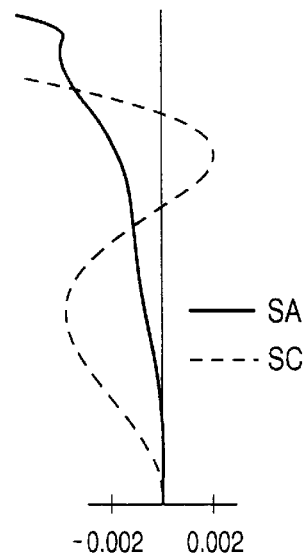

FIGS. 11A and 11B show spherical aberration and sine condition when the objective lens 20 according to the second embodiment is used for the first disc 30, and focusing is performed (i.e., the surface of the first disc 30 moves in the direction of the optical axis, and the objective lens 20 is also moved for focusing). FIG. 11A shows the characteristic when the first disc 30 is moved away from the laser module 10 by 1 mm (i.e., the displacement of the disc is +1 mm). FIG. 11B shows the characteristic when the first disc 30 is moved toward the laser module 10 by 1 mm (i.e., the displacement of the disc is −1 mm).

Figure 12A:
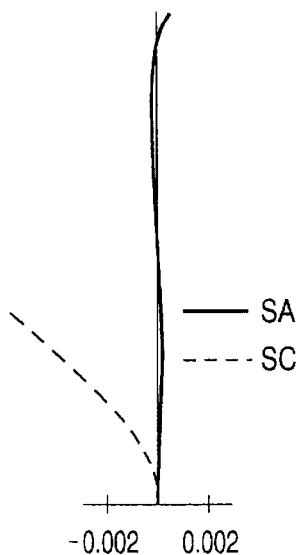
FIGS. 12A and 12B show spherical aberration, sine condition and astigmatism when the objective lens shown in FIG. 9 is used for the second disc.
Figure 12B:
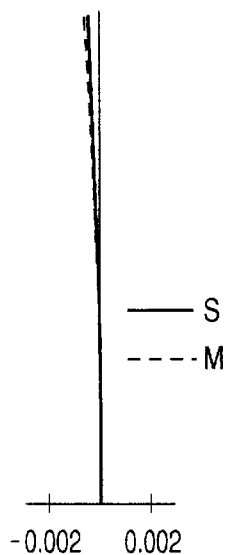
Figure 13A:
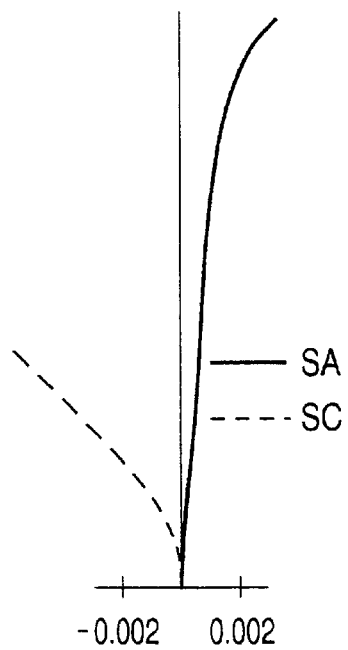
FIGS. 13A and 13B show spherical aberration and sine condition when the objective lens shown in FIG. 9 is used for the second disc, and focusing is performed.
Figure 13B:
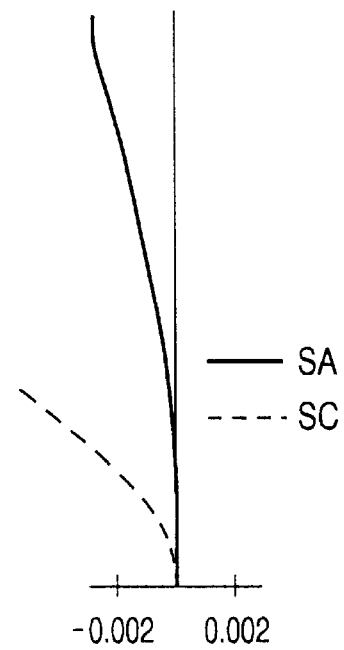

FIGS. 12A and 12B show spherical aberration and sine condition when the objective lens 20 is used for a second disc 31 and is in a reference condition, and FIGS. 13A and 13B show spherical aberration and sine condition when the objective lens 20 is used for the second disc 31, and focusing is performed.

Wavefront aberration when the objective lens 20 is in a reference condition, and moved for focusing when the discs are moved by ±1 mm are indicated in TABLE 6.

TABLE 6

| | FIRST DISC 30 | SECOND DISC 31 |
|---|---|---|
| REFERENCE CONDITION | 0.003λ | 0.002λ |
| +1 mm | 0.049λ | 0.014λ |
| −1 mm | 0.056λ | 0.018λ |

Given that the image magnification M of the objective lens 20 is approximately −0.14, if the allowable level of the wavefront aberration is 0.050λ, change of the wavefront aberration due to displacement of the optical disc 30 and 31 by 1 mm is substantially at the critical area.

Aberration due to the tracking operation will be discussed.

Figure 14:
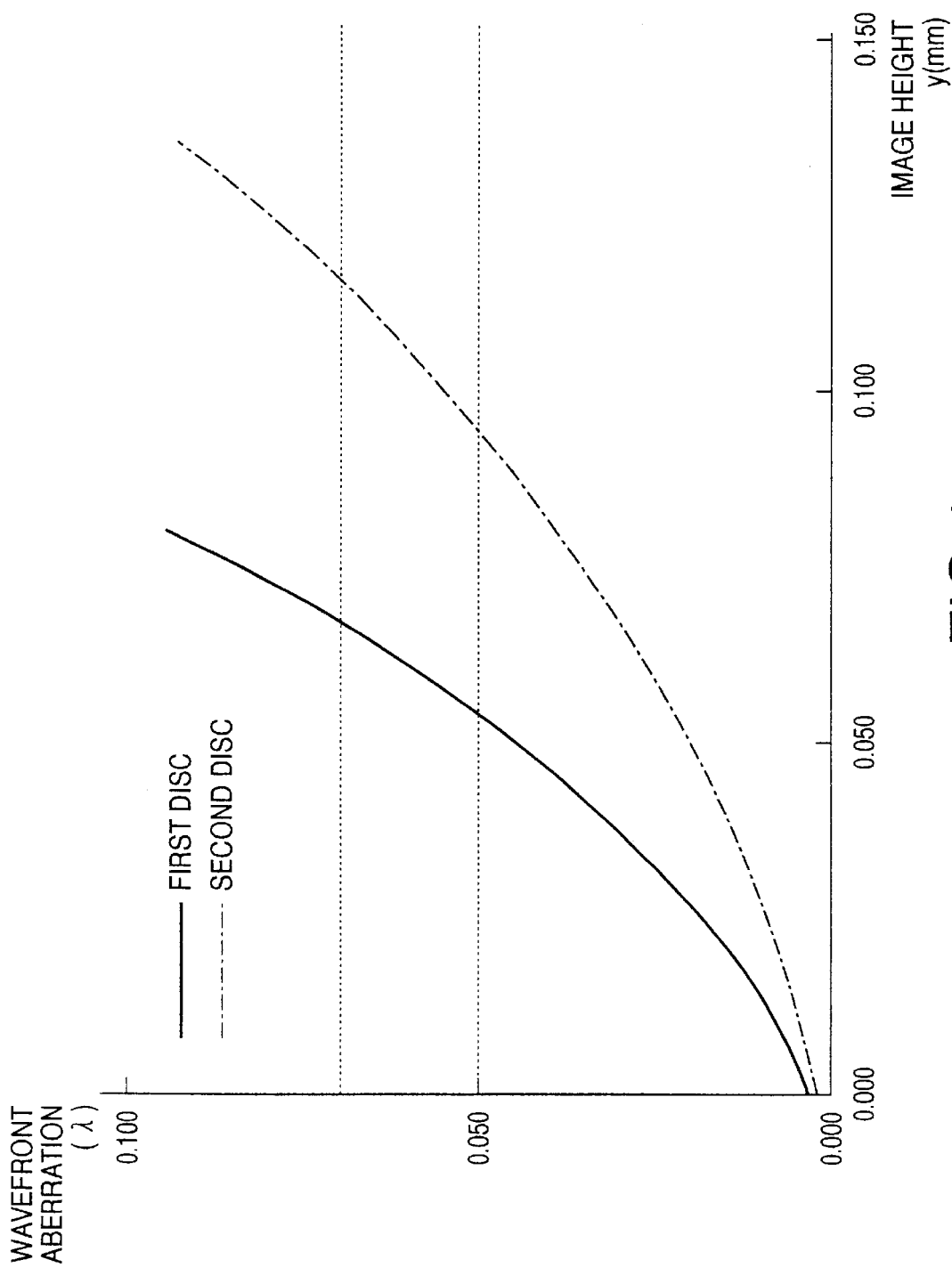
FIG. 14 is a graph showing a relationship between an image height and wavefront aberration with respect to the optical system according to the second embodiment.

FIG. 14 is a graph showing a relationship between an image height y and wavefront aberration with respect to the optical system according to the second embodiment. The characteristic with respect the first disc 30 is represented by a solid line, the characteristic with respect to the second disc 31 is represented by a one-dotted line.

According to the graph shown in FIG. 14, the image height y at which the wavefront aberration is 0.05λ is 0.0534 mm for the first disc 30, and 0.0937 mm for the second disc 31. If the allowable level of the wavefront aberration is 0.05λ, the above indicated image heights are in the allowable range.

According to formula (4), the allowable tracking width is ±0.434 mm for the first disc 30 (M=−0.1432), and ±0.754 mm for the second disc 31 (M=−0.1418). Therefore, the tracking widths obtained above satisfy the general requirement (i.e., ±0.4 mm).

The present disclosure relates to the subject matter contained in Japanese Patent Application No. HEI 11-340592, filed on Nov. 30, 1999, which is expressly incorporated herein by reference in its entirety.

What is claimed is:

1. An optical system for an optical head employed in an optical disc drive, said optical disc drive using a plurality of optical discs, cover layers of the plurality of optical discs having different thickness, the optical system comprising:
  a light source unit provided with a plurality of light emitting points that are arranged close to each other, a plurality of diverging light beams having different wavelengths being emitted from said plurality of light emitting points, respectively, one of said plurality of light emitting points being used depending on a thickness of a cover layer of an optical disc;
  an objective lens that converges each of the plurality of diverging light beams emitted from said plurality of light emitting points on a data recording surface of an optical disc; and a light receiving unit that receives a light beam reflected by the data recording surface of the optical disc and generates electronic signals corresponding to the received beam, wherein an image magnification M of said objective lens satisfies the following condition for each of the plurality of diverging light beams:

$$-0.144 < M < -0.099.$$

2. The optical system according to claim 1, wherein a light beam having a longer wavelength is selected for an optical disc having a thicker cover layer, said objective lens being located closer to the disc, and wherein a light beam having a shorter wavelength is selected for an optical disc having a thinner cover layer, said objective lens being located farther from the disc.

3. The optical system according to claim 1, wherein a distance from each of said plurality of light emitting points to a surface of the cover layer of a disc is constant regardless of the thickness of the cover layer.

4. The optical system according to claim 1, wherein said objective lens has a characteristic such that spherical aberration varies depending on the wavelength of a beam passing therethrough.

5. The optical system according to claim 1, wherein a diffraction lens structure is formed on at least one refraction surface of said objective lens, said diffraction lens structure has a characteristic such that spherical aberration varies depending on the wavelength of a beam passing therethrough.

6. The optical system according to claim 5, wherein said diffraction lens structure is configured such that the spherical aberration changes in an undercorrected direction when the wavelength of the light beam incident thereon increases.

7. The optical system according to claim 1, wherein said light source unit includes two light emitting points formed on a single chip.

8. The optical system according to claim 7, wherein said light receiving unit is mounted on a base plate on which said light source unit is provided.

9. The optical system according to claim 1, wherein said light source unit is configured such that each of the plurality of diverging light beams is incident onto the same optical elements.

10. The optical system according to claim 1, wherein said light source unit is configured such that the plurality of light emitting points are arranged adjacent to one another.

11. An optical system for an optical head employed in an optical disc drive, said optical disc drive using a plurality of optical discs, cover layers of the plurality of optical discs having different thickness, the optical system comprising:

a light source that selectively emits a plurality of diverging light beams having different wavelengths, one of said plurality of light beams being emitted depending on a thickness of a cover layer of an optical disc currently loaded in the disc drive;

an objective lens that converges each of the plurality of diverging light beams emitted from said light source on a data recording surface of an optical disc; and a light receiving unit that receives a light beam reflected by the data recording surface of the optical disc and generates electronic signals corresponding to the received beam, wherein an image magnification M of said objective lens satisfies the following condition for each of the plurality of diverging light beams:

$$-0.144 < M < -0.099.$$

12. The optical system according to claim 11, wherein said light source is configured such that each of the plurality of diverging light beams is incident onto the same optical elements.

13. The optical system according to claim 11, wherein said light source includes a plurality of light emitting points arranged adjacent to one another.

14. The optical system according to claim 11, wherein said light source includes two light emitting points formed on a single chip.

* * * * *